March 2, 1954     B. STACH     2,670,879
SEED SOWING DEVICE
Filed Oct. 6, 1949
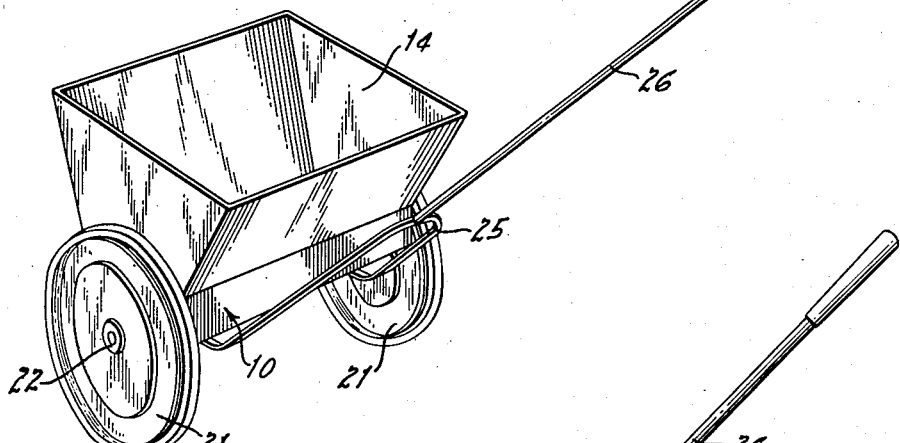
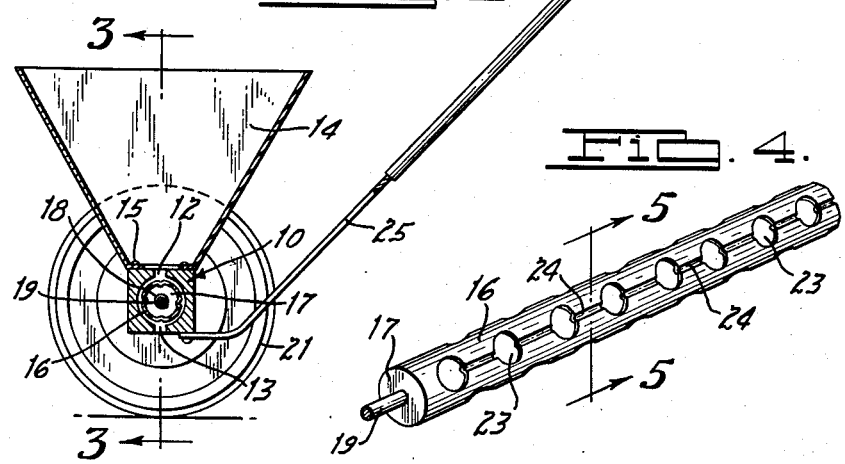
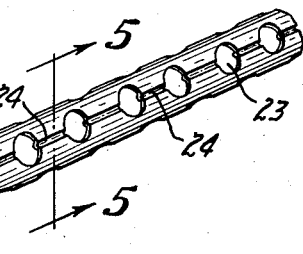
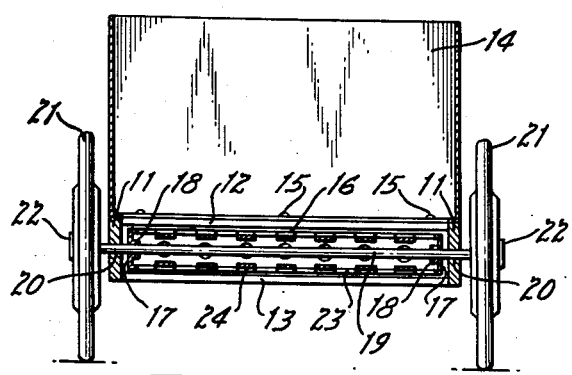
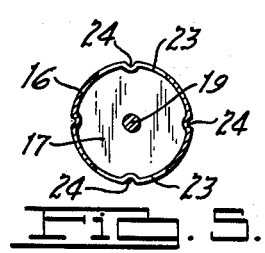
INVENTOR:
Benedict Stach,
BY *Louis Chaykla*
ATTORNEY.

Patented Mar. 2, 1954

2,670,879

UNITED STATES PATENT OFFICE 2,670,879

SEED SOWING DEVICE

Benedict Stach, Detroit, Mich.

Application October 6, 1949, Serial No. 119,960

2 Claims. (Cl. 222—177)

While my device has been made with the principal object of serving as a means of sowing seeds, such as grass seeds, upon lawns of homes and gardens, the device is of such a nature that it may also be used for the purpose of spreading fertilizer. My specific purpose was to make the device light in weight, simple, portable, economical in cost, and yet reliable in its performance.

I shall now describe my improvement with reference to the accompanying drawings, in which:

Fig. 1 is a perspective view of my device;
Fig. 2 is a vertical sectional view thereof;
Fig. 3 is a sectional view on line 3—3 of Fig. 2;
Fig. 4 is a perspective view of a rotary cylinder forming an essential part of my device;
Fig. 5 is a sectional view on line 5—5 of Fig. 4.

Similar numerals refer to similar parts throughout the several views.

The device comprises an oblong block 10, hollow inside and rectangular in cross-section. The block includes end walls 11, and is provided with a longitudinal slot 12 in the top wall and a similar slot 13 in the bottom wall. Mounted upon the block, by means of screws 15, is a funnel-shaped hopper 14 opening into said slot 12. Disposed within the block, for rotation therein, is a hollow cylinder 16, including end walls 17 and bushings 18, said bushings fitting over a shaft 19 and being welded or otherwise secured thereto for rotation with said shaft. The shaft extends outwardly through centrally located holes 20 in end walls 11, and serves as axles for wheels 21 which are secured to said axle or shaft 19 by means of washers 22. It will be understood that the wheels 21, the shaft 19, and the cylinder 16 rotate as a unit.

The cylinder itself is provided with a plurality of relatively large holes 23 which are arranged in rows within the wall of the cylinder, and which are connected by narrow grooves 24. Affixed to the underside of the block 10 is a fork-shaped member 25 provided with a handle 26.

The operation of the device is quite obvious. Seed or fertilizer is placed within the hopper, whereupon the device is wheeled over the ground. As the wheels 21 begin to turn, the cylinder is caused to rotate so that the holes 23 and grooves 24 will come under the slot 12. As a row of holes 23 will come directly under the slot, a quantity of seeds will fall by gravity, from the hopper 14 through the holes in said row into the interior of the cylinder 16. As the cylinder will continue rotating and rows of holes 23 will come successively into alinement with the lower slot 13 in block 10, the seeds will fall into said slot and pass through said slot to the ground. As for the grooves 24 which are normally too shallow to receive larger seeds, they are primarily intended to carry away straw blades, weed stalks and other oblong objects which would not fit into holes. If not carried away they would accumulate at the bottom of the hopper and clog the slot 12 interfering with the release of seeds from the hopper into the cylinder.

After having described my device, what I, therefore wish to claim is as follows:

1. A seed sowing device, said device including an oblong casing disposed horizontally and provided with a longitudinal opening at the top and a longitudinal opening at the bottom, a hollow cylinder disposed within the casing, the cylinder being provided with a plurality of openings in its wall, the openings being alined laterally and connected by grooves in the outer surface of the cylinder the grooves being too shallow for reception of seeds, a ground wheel at each end of the casing, a shaft connecting the wheels and the cylinder for rotation as a unit, a hopper mounted on the casing and having an outlet into the top opening therein, and a handle affixed to the casing whereby the device may be wheeled over the ground.

2. A seed sowing device, said device comprising an oblong casing disposed horizontally, the casing being provided with a slot at the top and a similar slot at the bottom, the two slots extending longitudinally of said casing, a hollow cylinder disposed within the casing, the wall of the cylinder being provided with a multiplicity of openings alined in rows lengthwise with respect to said cylinder and connected by grooves connecting the openings of each row the grooves being too shallow for reception of seeds, a hopper mounted on top of the casing and opening into the top slot thereof, a shaft axially disposed within the cylinder and extending outwardly from each end of said casing, a ground wheel affixed axially to each end of the shaft, the wheels, shaft, and cylinder being adapted to rotate as a unit, and handle means affixed to the casing to wheel the device over the ground.

BENEDICT STACH.

References Cited in the file of this patent

UNITED STATES PATENTS

| Number | Name | Date |
|---|---|---|
| 23,899 | Burrall | May 10, 1859 |
| 32,098 | White | Apr. 16, 1861 |
| 418,307 | Buchheim | Dec. 31, 1889 |
| 521,542 | Johnson | June 19, 1894 |
| 633,555 | Mitchell et al. | Sept. 19, 1899 |
| 1,390,383 | Powell | Sept. 13, 1921 |

FOREIGN PATENTS

| Number | Country | Date |
|---|---|---|
| 440,722 | Germany | Feb. 12, 1927 |